United States Patent Office 2,829,624
Patented Apr. 8, 1958

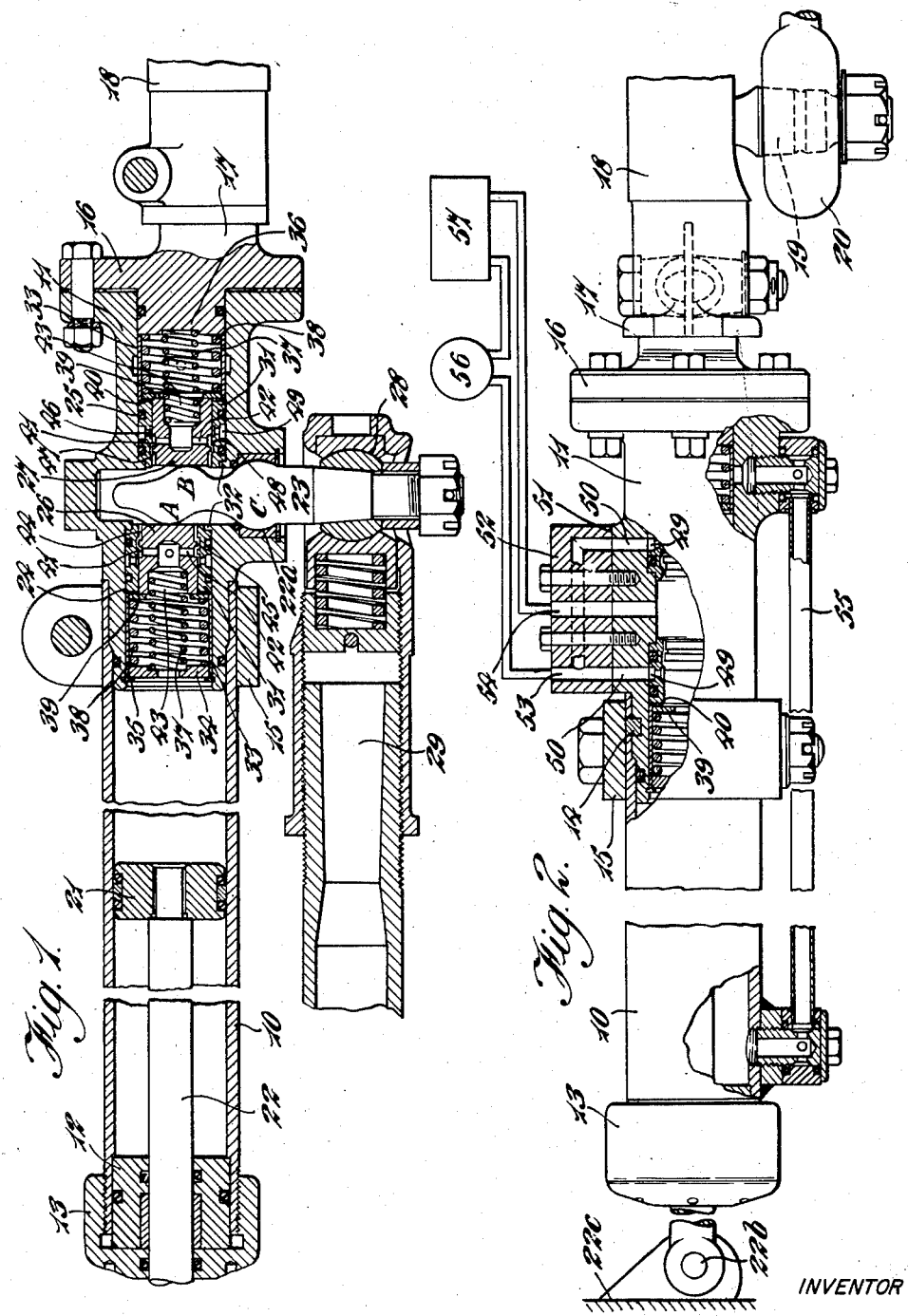

2,829,624

BOOSTER MOTOR FOR VEHICLE POWER ASSISTED STEERING MECHANISM

Philip G. Parkes, Luton, England, assignor to Adamant Engineering Company Limited, Luton, England Application April 27, 1955, Serial No. 504,325

Claims priority, application Great Britain May 10, 1954

5 Claims. (Cl. 121—41)

This invention relates to power assisted control mechanisms, such as vehicle steering mechanisms, in which movement of a manually operated member such as a steering wheel is transmitted through a mechanical linkage to one or more operated members such as the steerable wheels of the vehicle, a small degree of lost motion being provided in the linkage which lost motion is taken up when the operating member is moved to displace the operated member, the said lost motion being used to actuate valve means controlling the operation, by fluid pressure, of a booster motor acting to assist the movement of the operated member or members.

The invention relates particularly to that kind of power assisted control mechanism in which the booster motor is a cylinder-and-piston unit in which the piston is movable in opposite directions by fluid pressure acting in the respective ends of the cylinder and is mounted on a piston rod projecting through one end of the cylinder, two separate valve units being provided each of which controls the fluid pressure conditions in one end of the cylinder, the two valve units being operated by a rocking arm to cause fluid pressure to act in one direction on the piston when the arm is rocked in one direction and to cause fluid pressure to act in the other direction on the piston when the arm is rocked in the other direction, a reaction being applied to the rocking arm which is proportional to the pressure acting on the piston.

In a booster motor of the kind above specified, a given fluid pressure exerts a greater thrust in one direction than in the other, by reason of the different effective areas of the two sides of the piston, and consequently, if the reaction applied to the rocking arm in both directions is in the same proportion to the fluid pressure, it will not be in the same proportion to the thrust for both directions of operation.

The object of the present invention is to provide a power assisted control mechanism of the kind referred to in which the above-mentioned disadvantage is avoided.

According to the present invention, in a power assisted control mechanism of the kind referred to the reaction applied to the rocking arm by pressure acting on that side of the booster motor piston having the smaller effective area is applied thereto at a point nearer to the pivot of the said rocking arm than is the reaction applied thereto by the pressure acting on the other side of the said piston, the ratio of the distances of the points at which the two reactions are applied to the rocking arm from the pivot of the said arm being equal to the ratio of the effective areas of the sides of the piston. The reactions are conveniently applied to the rocking arm through the valve units.

The invention is hereinafter described with reference to the accompanying drawings, in which:

Figure 1 is a sectional plan of the cylinder-and-piston unit, valve mechanism, and some associated parts of a power assisted control mechanism for use in the steering gear of a motor road vehicle; and Figure 2 is an elevation, partly in section, of the cylinder-and-piston unit shown in Figure 1.

The cylinder-and-piston unit comprises a cylinder 10 secured at one end to a valve housing 11 and closed at the other end by a head 12 retained in position by a screw-cap 13. The valve housing 11 includes a spigot portion which enters the bore of the cylinder 10 and is retained therein by dowels 14 held in position by a clamp ring 15. The other end of the valve housing is closed by an end plate 16 having formed integrally therewith a stem 17 to which is clamped the socket portion 18 of a ball-and-socket joint of the type commonly used in vehicle steering gears, the ball pin 19 of the joint being adapted for securing to a steering arm or like element 20 of the steering gear of a vehicle. The piston 21 of the piston-and-cylinder unit is mounted on a rod 22 passing through the head 12 and cap 13, the rod being adapted for pivotal connection to an anchorage point 22b on a vehicle chassis part of which is shown at 22c. Thus displacement of the cylinder 10 relative to the piston 21 will move the steering arm or equivalent to effect steering movement of the vehicle wheels. An aperture in the side of the valve housing 11 accommodates a split spherical bearing 22a for a rocking arm 23, and two bores 24 and 25 in the said housing, both parallel to the axis of the cylinder 10 and both having their axes in a common plane containing the centre of the spherical bearing 22a lie one on each side of the rocking arm 23. In the bores 24 and 25 respectively there are mounted identical valve plungers 26 and 27 each engaged at the centre of its inner end by a convexly curved edge portion of the rocking arm 23, so that rocking of the said arm in one direction from a mean position moves one valve plunger outwardly, and rocking of the said arm in the other direction from the mean position moves the other valve plunger outwardly.

The rocking arm 23 is coupled by a ball-and-socket joint 28 to a drag link 29 which is connected in the usual manner to a drop-arm (not shown) which is operated by the usual steering wheel through a steering box of the usual type.

Each of the bores 24 and 25 has mounted in it a ported sleeve 31 held against a shoulder 32 in the bore by a spacing sleeve 33. The spacing sleeve 33 in the bore 24 is held in position by an annular disc 34 itself resting against a spring ring 35 engaging a groove surrounding the bore, and the spacing sleeve 33 in the bore 25 is held in position by a spigot 36 on the end plate 16.

The valve plungers 26 and 27 are slidable in the two sleeves 31 respectively, each plunger being urged inwardly by a spring 37 acting directly on it.

Outward movement of each plunger beyond a predetermined position is opposed, not only by the spring 37 acting on that plunger, but also by a second spring 38 acting on an annular washer 39 which overlaps the outer end of the plunger, inward movement of the washer 39 being limited by the sleeve 31. Additional washers 40 of shim steel may be provided between the sleeve 31 and the washer 39 to adjust the position to which plunger is urged by the spring 38, that position being such that both of the plungers 26 and 27 just engage the rocking arm 23. Each valve plunger is formed with a circumferential groove 41 connected by radial passages 42 to a recess 43 extending from the outer end of that valve plunger, and has an inner end portion 44 of reduced diameter separated from the groove 41 therein by a land 45. Each sleeve 31 is formed with two internal circumferential grooves 46 and 47 separated by a land 48 of less width than the groove 41 in the valve plunger, the outer groove 46 being connected by radial passages in the said sleeve to an external circumferential groove 49. Passages 50 lead from the grooves 49 to an external flat face 51 (Figure 2) on the outside of the valve housing, and are connected by passages in a connecting block 52 to a liquid pressure inlet 53 to which liquid is supplied by a pump 56. A return passage 54 in the block 52 and valve housing allows the escape of liquid from the centre of the valve housing 11 between the two valve plungers to a reservoir 57 from which the pump draws liquid.

The passages 42 and recess 43 in the valve plunger 26 provide direct communication with the adjacent end of the cylinder 10. A conduit 55 external to the cylinder 10 connects the other end of the cylinder to the bore 25 on the outer side of the valve plunger 27.

When the valve plungers 26 and 27 are in their central positions, as shown in Figure 1, the groove 41 in each valve plunger bridges the land 48 on the corresponding sleeve 31, and liquid delivered by the pump to the inlet 53 can flow through the passages 50 of both valve units, past the lands 48 by way of the grooves 41 and so to the return passage 54, no substantial pressure being built up in either end of the cylinder 10. If the steering wheel of the vehicle is turned to rock the arm 23 in a clockwise direction as shown in Figure 1, the valve plunger 27 is moved outwardly against its springs 37 and 38 and the valve plunger 26 moves inwardly under the load of the spring 38 to follow up the movement of the arm. The flow of liquid past the valve plunger 27 to the return passage is thus restricted by the approach of the land 45 on that valve member to the land 48 on the corresponding sleeve 31, whereas the corresponding lands on the valve plunger 26 and its sleeve 31 move apart and facilitate the escape of liquids from the right-hand end of the cylinder 10. At the same time, the movement of the valve plungers 26 and 27 provides increased opening of the groove 41 in the plunger 27 to the groove 46 in the corresponding sleeve 31, and reduced opening of the groove 41 in the plunger 26 to the groove 46 in its associated sleeve 31, so that the flow of liquid from the pump to the left-hand end of the cylinder 10 is facilitated, and the flow of liquid to the right-hand end of the cylinder is reduced. A difference of pressure across the piston 21 is thus produced which displaces the cylinder to the right, tending to restore the rocking arm 23 to its neutral position, so that the cylinder 10 follows up the movement of the drag link 29 and moves the steered wheels to an extent depending on the rotation of the steering wheel. Turning of the steering wheel in the opposite direction causes the valve plungers to move in the opposite direction, thus turning the steered wheels in the opposite direction.

The outer end faces of the valve plungers 26 and 27 are exposed to the pressures acting in the respective ends of the cylinder 10 in which they control the pressure, and they thus exert a reaction thrust on the rocking arm proportional to those pressures, the two valve plungers being of equal area, so that the reaction pressures are in the same proportions to the cylinder pressures.

Owing to the presence of the piston rod 22, the effective area of the left-hand side of the piston 21 is less than the effective area of its right-hand side, so that the thrust exerted by any particular pressure is greater on the right-hand side than on the left. The reaction exerted by the valve plungers on the rocking arm is proportional to the pressure and therefore, to obtain reaction thrusts which are proportional to the thrusts exerted on the piston, the valve plunger 26 is arranged, as shown in Figure 1, to act on the rocking arm at a point A further from the fulcrum of the arm at 22a than the point B at which the valve plunger 27 acts on the said arm. The fulcrum axis of the rocking arm 23 being at C, the ratio of the distances AC and BC is made equal to the ratio between the effective areas of the left-hand and right-hand sides of the piston 21.

I claim:

1. In a power assisted control mechanism, a source of fluid pressure, a booster motor, said motor comprising a cylinder, a rod within said cylinder and projecting through one end of said cylinder, a piston on said rod within said cylinder and having different effective areas on the sides thereof and movable in opposite directions by fluid pressure acting on the respective ends of the cylinder, two separate valve units each of which controls the fluid pressure in one end of said cylinder and on a different side of said piston, a pivotally mounted rocker arm having a portion thereof extending between said valve units so that rocking of the arm in one direction will open one valve unit and close the other valve unit to create a difference of fluid pressure within said cylinder and across said piston to cause a reaction pressure within said cylinder in one direction, rocking of the arm in the other direction causing a reaction pressure in the cylinder in the other direction, and protrusions on said rocker arm engageable by said valve units and located at different distances from the pivot points of said rocker arm, the ratios of said distances being equal to ratios of said effective areas of said piston whereby the reaction being applied to either side of the rocker arm is proportional to the pressure acting on the piston.

2. In a power assisted control mechanism, as claimed in claim 1, with a valve housing mounted on the cylinder of the cylinder and piston unit, said valve units being mounted in said valve housing, said rocking arm being pivotally mounted in said valve housing.

3. In a power assisted control mechanism, as claimed in claim 1, wherein each valve unit comprises a plunger movable by the rocking arm to a neutral position to increase the pressure acting on one side of the piston and urged against the rocking arm by the pressure on that side of the piston.

4. In a power assisted control mechanism, comprising a source of fluid pressure, a manually operated member and an operating member, a booster motor to assist the movement of said operated member by said operating member, a valve housing and valve means within said housing controlling the boosting operation of said motor, said motor comprising a cylinder, a piston, and a rod, said piston mounted upon said rod, a rocking arm connected to said operating member and pivotally mounted on said housing and having a first convexly shaped contour on one side thereof and a second convexly shaped contour on the other side thereof, two identical valve plungers mounted within said cylinder on either side of said rocking arm, said first convexly shaped contour of said rocking arm engaging one of said valve plungers and said second convexly shaped contour engaging the other of said valve plungers, spring means biasing each of said valve plungers against said rocking arm, said rocking arm being pivotable by said manually operating member in one direction, thereby pushing one of said valve plungers in outward direction with the opposite valve plungers following in the same direction to close one of said valve means and opening the other to create a difference of pressure within said cylinder and across said piston, thereby causing a relative displacement of said piston with said cylinder and thus creating a reaction pressure within said cylinder in one direction or the other, said reaction pressure tending to force said rocking arm back to its initial position against the force exerted through said operated member.

5. A mechanism according to claim 4 wherein said piston is mounted upon said piston rod in such a manner that said piston rod protrudes from one end of said cylinder, the effective area of said piston being smaller on one side than on the other side, one of said valve plungers undergoing the reaction to the pressure exerted upon the smaller effective area of said piston is mounted closer to the pivot of said rocking arm whereby the co-operating convexly shaped contours of said rocking arm is situated closer to the pivot of said rocking arm than is the other one of said convexly shaped contours cooperating with the valve plunger undergoing the reaction to the pressure exerted upon the larger effective surface of said piston, the ratio of the distances of the points at which the two reactions are applied to the rocking arm from the pivot of said arm being equal to the ratio of the effective areas of the sides of the piston.

References Cited in the file of this patent

UNITED STATES PATENTS

| | | |
|---|---|---|
| 1,385,658 | Blasiar | July 26, 1921 |
| 2,063,937 | Kundig | Dec. 15, 1936 |
| 2,292,325 | Lawler | Aug. 4, 1942 |
| 2,627,847 | Clark | Feb. 10, 1953 |
| 2,635,582 | Zeilman | Apr. 21, 1953 |
| 2,650,669 | Hammond | Sept. 1, 1953 |
| 2,766,732 | Schultz | Oct. 16, 1956 |